United States Patent
Brassac

(10) Patent No.: US 10,120,699 B2
(45) Date of Patent: Nov. 6, 2018

(54) METHOD FOR ACCESSING MULTIPLE INTERNAL REGISTERS OF A SERVER

(71) Applicant: BULL SAS, Les Clayes sous Bois (FR)

(72) Inventor: Claude Brassac, Saint Germain en Laye (FR)

(73) Assignee: BULL SAS, Les Clayes sous Bois (FR)

( * ) Notice: Subject to any disclaimer, the term of this patent is extended or adjusted under 35 U.S.C. 154(b) by 115 days.

(21) Appl. No.: 14/741,671

(22) Filed: Jun. 17, 2015

(65) Prior Publication Data

US 2015/0370578 A1 Dec. 24, 2015

(30) Foreign Application Priority Data

Jun. 18, 2014 (FR) ...................... 14 55594

(51) Int. Cl.
| | |
|---|---|
| *G06F 15/167* | (2006.01) |
| *G06F 9/445* | (2018.01) |
| *G06F 15/177* | (2006.01) |
| *G06F 9/54* | (2006.01) |
| *G06F 9/30* | (2018.01) |

(52) U.S. Cl.
CPC ...... *G06F 9/44505* (2013.01); *G06F 9/30098* (2013.01); *G06F 9/541* (2013.01); *G06F 15/177* (2013.01)

(58) Field of Classification Search
CPC .. G06F 9/44505; G06F 9/30098; G06F 9/541; G06F 15/177; H04L 61/2596; H04L 61/15
See application file for complete search history.

(56) References Cited

U.S. PATENT DOCUMENTS 6,665,731 B1 * 12/2003 Kumar ................ H04L 41/0266
709/223
6,874,049 B1  3/2005 Wyland
(Continued)

FOREIGN PATENT DOCUMENTS

EP    0486148    5/1992

OTHER PUBLICATIONS

European Search Report dated Feb. 23, 2016; Application No. EP 15 17 2806.
(Continued)

*Primary Examiner* — Nam T Tran
(74) *Attorney, Agent, or Firm* — Young & Thompson

(57) ABSTRACT

A method is provided for facilitating access by an external user to the internal registers of a server including: transmitting access commands originating from the external user to a service processor using a communication protocol directly understandable by the service processor which accesses the internal registers using one or more access protocols, automatically transforming command lines issued by the user into access commands in the communication protocol using one or more service modules which associate at least the corresponding addresses of the internal registers with the names of the internal registers supplied by the external user. On the occasion of a user-commanded access by the service processor to the internal registers, the service processor is responsible for managing a possible risk of collision with a monitoring access to the internal registers for the purposes of updating a copy of the status of the internal registers.

14 Claims, 4 Drawing Sheets

(56) References Cited

U.S. PATENT DOCUMENTS

| | | | |
|---|---|---|---|
| 7,590,737 B1* | 9/2009 | Chen | G06F 11/004 709/223 |
| 9,344,524 B2* | 5/2016 | Arnault | H04L 67/32 |
| 2006/0004824 A1* | 1/2006 | Hsieh | G06F 11/2294 709/223 |
| 2006/0101372 A1* | 5/2006 | Zhuo | H04L 41/0226 717/100 |
| 2010/0217843 A1 | 8/2010 | Dehaan et al. | |
| 2013/0145046 A1 | 6/2013 | Rivkin | |
| 2014/0215489 A1* | 7/2014 | Bhatia | G06F 9/546 719/313 |

OTHER PUBLICATIONS

Alexandre Scott: "Réaliser un programme puis une interface graphique unifiant et automatisant l'accés aux consoles des serveurs réels ou virtuels", Rapport d'ingénieur Stage de 2éme année, Sep. 4, 2013, pp. i-49, XP055168421.

Seshadri N. Raghavendra Babu: "Using IPMItool raw commands for remote management of Dell PowerEdge Servers", Nov. 1, 2007, XP055168414.

* cited by examiner

```
40  pyreg># python -i machine.py
41  >>> m = Machine("Mesca2-EVT2-BCS4")
42  >>> f=m.fpga[0]
43  >>> r.read("CIX_Functionality_Register_1")
44  (12, [('EMERGENCY_PWROFF', 0), ('MRM_HOT_PLUG', 0), ('PCIE_HOT_PLUG', 1),
       ('LCP_PWRON', 1)])
```

Fig.4

METHOD FOR ACCESSING MULTIPLE INTERNAL REGISTERS OF A SERVER

FIELD OF INVENTION

The invention relates to methods for accessing multiple internal registers of a server.

BACKGROUND OF THE INVENTION

In the prior art, it is known for an external user of a server to directly supply access commands in a communication protocol directly understandable by this service processor to the service processor that is managing access to internal registers of that server.

Nevertheless, in order to do this, the external user must be in a position to master not only the type of internal registers but also their address or even their content or addressing format along with the communication protocol. This makes access to these internal registers somewhat complicated for an external user.

Moreover, as the average external user may not have complete control over all of this information, the risk of error is not negligible.

SUMMARY OF THE INVENTION

The aim of the present invention is to provide a method for accessing internal registers of a server which at least partially overcomes the aforementioned drawbacks.

More particularly, the invention aims to provide a method for accessing internal registers of a server that firstly does not require detailed knowledge on the part of the external user of the communication protocol directly understandable by the service processor and, secondly, does not require either a detailed knowledge by the external user of the structure of said internal registers and their implementation in the server. This in order to make access to these internal registers by the external user both more ergonomic and more safe, in other words that access to internal registers becomes easier and presents a risk of error that is eliminated or at least greatly reduced.

For this, the invention, after having highlighted the difficult nature of accessing internal registers by the external user and the particular interest that there might be in making these internal registers accessible even to an external user who is not a specialist in either the communication protocol or even the structure and implementation of said internal registers, simultaneously provides for information about the structure and implementation of said internal registers to be passed up to a higher layer or layers of the system, and at this or these higher layer(s), provides for means for translating commands in a relatively high-level language into this communication protocol.

The passing of this information to a higher layer or layers and the implementation of a translation means represents a system-modification effort that seems at first sight significant but which is, however, largely made profitable by the fluidity and ease of access to internal registers of the server the invention provides for the external user, not to mention the substantial reduction in the risk of error, particularly in terms of incorrect addressing of the internal registers.

To this end, the present invention provides a method for accessing a plurality of internal registers of a server, comprising transmitting access commands originating from an external user of the server to a service processor of said server using a communication protocol directly understandable by said service processor, access by said service processor to said internal registers using one or more access protocols to access said internal registers, automatic transformation of command lines issued by said user into access commands in said communication protocol by one or more service modules, the language of said command lines being of higher level than that of said communication protocol, said one or more service modules mapping names of said internal registers contained in said command lines to at least the corresponding addresses of said internal registers in said access commands, the method being characterized in that on the occasion of a user-commanded access by said service processor to said internal registers, a possible risk of collision with a monitoring access under direct control of said service processor to said internal registers for the purposes of updating a copy of the status of said internal registers is managed by said service processor.

Access to an internal register of the server is a read access or a write access. An internal register of a server is an internal register of a computing component of the server which is distinct from a memory, the server comprising computing components and memories. The dedicated nature of the communication protocol and the relatively hidden or buried nature of the information relating to internal registers, does not predispose to performing passage up to the highest layers of the system.

During said access by the service processor to the internal registers, commanded by the user, a possible risk of collision with a monitoring access to said internal registers, commanded directly by said service processor in order to update a copy of the status of said internal registers is managed by the service processor. Thus, the service processor, upon directly receiving both types of requests for access to internal registers, one from the external user just like one from the monitoring process, can, at its level, manage the risk of collision and consequently obviate it more readily.

To this end, the present invention also provides a user interface, for accessing multiple internal registers of a server, adapted to transmit access commands originating from a user external of the server to a service processor of the server, using a communication protocol directly understandable by said service processor for access by said service processor to said internal registers, using one or more access protocols to said internal registers, characterized in that it comprises one or more service modules adapted to automatically transform command lines issued by said user into said access commands in said communication protocol, the language of said command lines being of a higher level than that of said communication protocol, and for associating to the names of said internal registers contained in said command lines, at least the corresponding addresses of said internal registers in said access commands.

According to embodiments of the invention, provision is consequently made to provide external users with a simple access method, whether for reading or writing, to the internal registers of computing components of a server.

According to a preferred embodiment of the invention, provision is consequently made to provide a command line interface in order to be able to read and write the internal registers of computing components and also giving the ability to write scripts by providing Python modules to the external user.

According to embodiments of the invention, provision is made to carry out these accesses on a machine even if the latter is in operation.

According to embodiments of the invention, provision is made to generate a complete list of all internal registers with their name, address and description of their content, to provide a scripting language with modules that hide from the user, in other words make it transparent for him, all or part of the following elements, which include: the method of access to these registers, the problem of concurrent access to these registers because of the fact that the machine is in operation, the address of the registers and the powered status of the server.

According to preferred embodiments, the invention comprises one or more of the following features that can be used separately or in partial or full combination therebetween, in particular with one of the foregoing subject matter.

Preferably, said one or more service modules associate to the names of said internal registers contained in said command lines, also addressing formats corresponding to said internal registers, in said access commands. Thus, all relevant information to allow the service processor to access internal registers is incorporated into the access commands and will not need to be added in another additional step.

Preferably, at least one of said service modules contains a list of names of said internal registers associating to said names, the corresponding addresses of said internal registers, said list comprising preferably all said internal registers that may be accessed by said user, and at each server configuration, this list is updated. The updating of the list of internal registers upon each server configuration is particularly advantageous because it guarantees the external user access to all internal registers that may be of interest at any time, and this, even if at a given point in time, the structure or the implementation of an internal register is modified. If this were not the case, on the occasion of such a modification, access to the internal register could not take place until such point that an update operation for the modification of this internal register had not been performed elsewhere.

Preferably, said list also associates to said names and to said addresses, a description of all the bits of said internal registers. As a consequence, not only is access to the internal registers guaranteed to the external user, but also fine-grained operations, such as changing or analyzing a particular bit, are rendered possible.

Preferably, said risk of collision is avoided by putting on hold said access commanded by said user during all stages of the progression of a said monitoring access which will not be interrupted. Indeed, a slight delay in access commanded by the external user does not have serious consequences, while a poorly controlled disturbance occurring in the middle of the monitoring process can significantly degrade system operation.

Preferably said progression of a said monitoring access includes at least the sequence of a reconfiguration of a multiplexer located between the service processor and said internal registers and a step of reading at least one of the internal registers. The interruption of the monitoring process that could occur just between the reconfiguration of the multiplexer and the reading would significantly disrupt the operation of the system since it would be another access request, just the one originating from the user, which would inherit the reconfiguration planned for the access request by the monitoring process.

Preferably, said command lines can be grouped into one or more scripts. Thus, the management of said internal registers by the external user is made more fluid for the external user. A command line interface is a man-machine interface in which communication between the user and the computer is performed in text mode, the user typing text commands and reading text responses. A script is a program that allows the execution of tasks without requiring compilation, merely using interpretation.

Preferably, the command lines only require the user to supply the name of the internal register to be accessed, excluding its address, its address format, and its access mode. Thus, the management of said internal registers by the external user is made even simpler for the external user.

Preferably, in response to one of the command lines from the user, the bit values of said internal registers are displayed together with the names of the field corresponding to these bits. Thus, the external user can verify, bit-by-bit for each internal register, that its content matches the information he expects to find. This added security will allow the external user to immediately notice a change in the structure of an internal register which had not previously been brought to his attention or which might have escaped his attention, or to perform fine-grained configuration of an internal register if necessary.

Preferably, the language of said command lines is the Python language. This language is particularly simple and fluid for the external user, for the management of the internal registers of the server. Python is a known high-level programming language, with limited syntax for command lines, and particularly effective in a scripting context.

Preferably, said communication protocol is the IPMI protocol. This communication protocol is particularly effective in performing intended operations on the internal registers of the server. IPMI (for "Intelligent Platform Management Interface") is a standardized interface for external management of information systems, as here where a server can be managed by an external user through the external user's personal computer.

Preferably, said IPMI communication protocol runs on an Ethernet bus. The Ethernet bus is an effective gateway to transmit commands in IPMI protocol between the PC type computer of the external user and the service processor of the server.

Preferably, said internal registers belong to one or more components of the server, one or more CPUs and/or one or more ASICs and/or one or more FPGAs being able to be among said components. The wide variety of components whose internal registers are likely to be managed by the external user makes the method for accessing internal registers provided by the invention all the more useful, for this access method is simplified and made more fluid.

Other characteristics and advantages of the invention will appear on reading the following description of a preferred embodiment of the invention, given by way of example and with reference to the accompanying drawings.

BRIEF DESCRIPTION OF THE DRAWINGS

FIG. 4 schematically shows an example of a response to an external user command line, corresponding to the software architecture of FIG. 1, according to one embodiment of the invention.

DETAILED DESCRIPTION OF EMBODIMENTS

Figure 1:
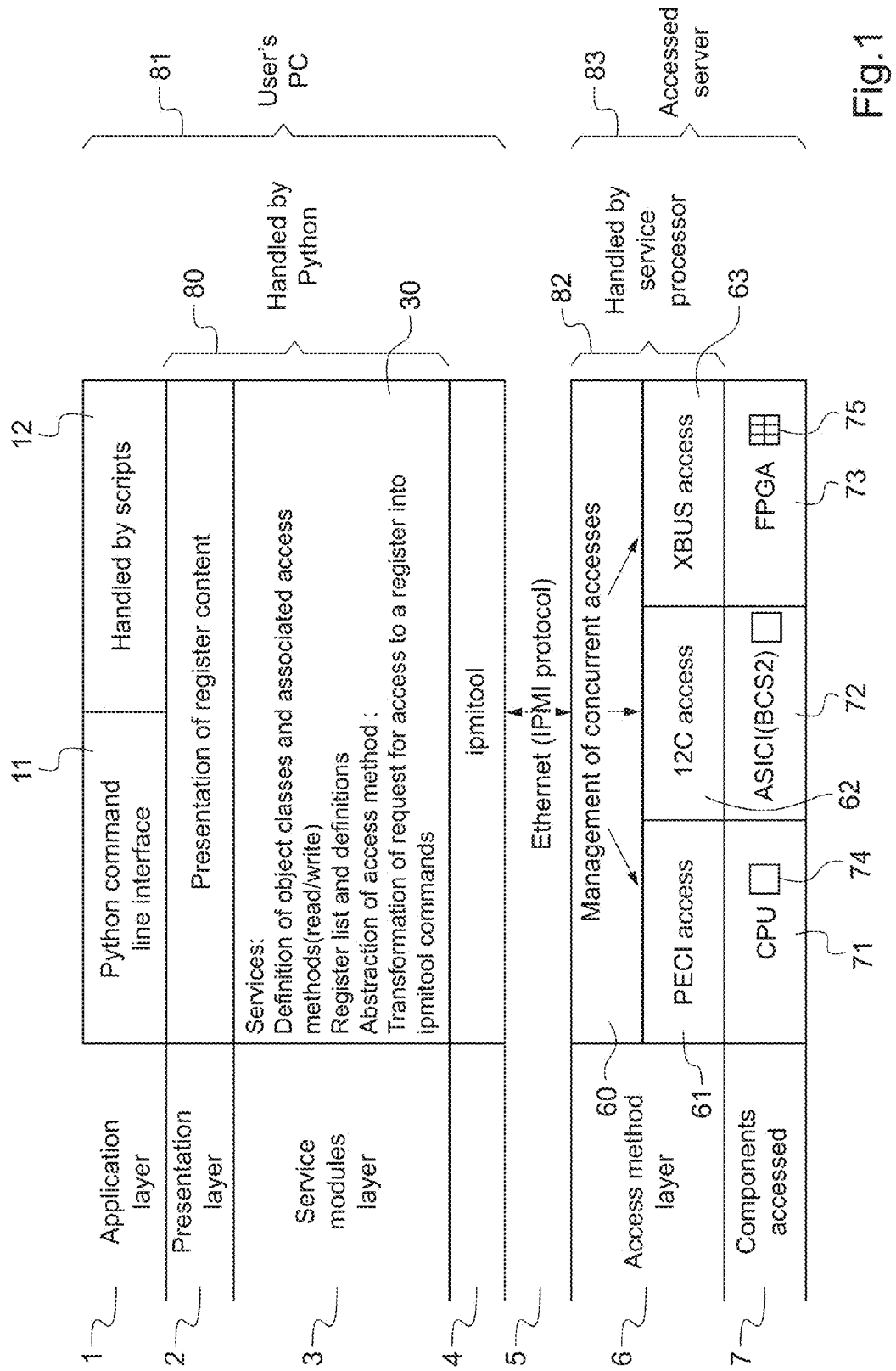
FIG. 1 schematically shows an example of software architecture implementing passage up to higher layers of information relating to internal registers of a server in the course of performing a method for accessing internal registers of this server according to one embodiment of the invention.

FIG. 1 schematically shows an example of a software architecture implementing passage up to higher layers of information relating to internal registers of a server in the course of performing a method for accessing internal registers of this server according to one embodiment of the invention.

The computer system comprises several stacked layers running from the lower layer corresponding to the components of the server itself to the highest layer corresponding to the interface with the external user. The layers are stacked so we have, running successively from the lowest to the highest: layer 7 for the accessed components, layer 6 for the access method, layer 5 for the Ethernet bus, layer 4 for the IPMI toolbox, layer 3 for the service modules, layer 2 which is the presentation layer, layer 1 which is the application layer.

Accessed component layer 7 includes several types of components 74 themselves comprising one or more internal registers 75. It is to these internal registers 75 which the external user wants to gain access in order to manage and possibly modify them. Accessed component layer 7 for instance includes a component 71 of the CPU ("Central Processing Component") type, an ASIC ("Application Specific Integrated Circuit") type component 72, a FPGA ("Field Programmable Gate Array") type component 73.

Layer 6 corresponds to the access method: this includes access protocols layer 61-63 and a layer 60 for managing access concurrency which is located above the access protocols layer 61 to 63. Each of the components 71-73 is accessed by means of a corresponding access protocol 61 to 63. The component 71 of the CPU type is accessed through the standardized "PECI access" ("Platform Environment Control Interface") protocol 61. The ASIC-type component 72 is accessed through the "I2C access" ("Inter Integrated Circuit") access protocol 62. The FPGA-type component 73 is accessed through the "XBUS access" ("XBUS" being an alternative to "MBUS") access protocol 63. The access protocols 61-63 are respectively adapted to access components 71-73.

Layer 60 for access concurrency management manages and avoids the risk of collision in the case where there are several concurrent requests for access to the same component. The concurrent access management layer 60 establishes a hierarchy of access requests, a request for monitoring access, for updating the copy of the component's internal registers having a higher priority than an access request originating from an external user. Layer 6 for the access method is entirely managed by service processor 82.

In this way, these accesses are consequently not intrusive with respect to the monitoring software running on service processor 82. To achieve this, service processor software 82 manages concurrent access requests to the computing components 71-73 of server 83. These concurrent accesses can occur either between internal register access requests originating from the service processor and external access requests originating from the user, or between two users who are making external access requests to the same computing component.

Layer 60 handling access concurrency management not only manages access concurrency but also checks that these operations can be carried out regardless of the powered status of server 83. Indeed, access to server 83 will be made possible on a machine in operation, whether it be turned on or on standby. For this, these accesses are made through service processor 82 ("the Management Controller") which will be permanently powered up at least in standby mode, and which is on the CPU of server 83.

Furthermore, said accesses will not be intrusive with respect to software running on server 83. This is thanks to these accesses being made through service processor 82 in total independence with respect to other processors used by client applications.

Access protocols layer 61-63 allows service processor 82 to manage access to internal registers 74 of the various computing components 71-73 in a manner transparent to the external user. For this, service processor 82 will first provide the necessary drivers for each of the computing components 71-73 as well as the management of each of those protocols linking service processor 82 to each one of the computing components 71-73. Then, service processor 82 will manage concurrent access to the computing components 71 to 73, and will manage in particular the control switches allowing access to computing components 71 to 73. Next, service processor 82 will offer an external application IPMI type interface which is standard in server management. This interface takes at its input several items of information including: the type of computing component, its address, the address of the internal register concerned and the read and write access mode for this internal register.

Layer 5 of the Ethernet bus enables communication between, firstly the space of the external user's personal computer 81 which comprises layers 1 to 4 and, secondly, the space of server 83 to which the external user wishes to gain access and which comprises the layers 6 and 7. The communication running over the Ethernet bus uses the IPMI protocol.

Layer 4 of the IPMI toolkit makes it possible to encapsulate, in messages intended to pass on the Ethernet bus of layer 5, commands in IPMI language originating from layer 3. Layer 4 of the IPMI toolbox also allows extraction of IPMI language responses originating from layer 6 and that have passed on the Ethernet bus of layer 5.

Layer 3 for service modules 30 performs the tasks that will enable high-level command lines from the external user to be transformed into access commands of the lowest level which will be directly understood by service processor 82.

Several tasks are thereby performed. Firstly, the definition of object classes and access methods associated with them, whether this be for reading or writing.

Next, the list and the definition of the internal registers which the external user wants to access. It is in particular this list of the internal registers of the server with their address and address format, and with the description of each of their bits arranged in this place, in other words which is at this high layer 3 of service modules 30 in the personal computer space 81 of the external user, which firstly makes it possible to accept high-level command lines that are simple in structure from the external user and secondly to modify only slightly service processor 82 which still only contains directly commands in IPMI language. Significant modification of the structure of the service processor allowing it to accept commands from the highest level would be more complex and more costly than that of the implementation proposed by the invention, of the service modules 30 in the personal computer space 81 of the external user, which greatly facilitates the work of the external user by making it more ergonomic and easier through the sole use of simple command lines in a high-level language, e.g. the Python language.

Following this, we have transformation of the access request originating from the external user into IPMI commands command line format using the "IPMI-tool" toolbox available at Layer 4.

For this, layer 3 of service modules 30 will generate and update at each reconfiguration of server 83, an exhaustive list of all the internal registers 74 of all computing components 71 to 73, with, for each register 74, the name of the register, its address, and a description of its content, that is to say, of each of the bits 75 of the internal register 74.

All of this information, which is automatically generated from the design tools used for the development of server 83, will make it possible to ensure, for the external user, both completeness of the data he needs to manage the internal registers 74, their viability over time, which allows them to update at each reconfiguration of server 83, the consistency and universality of this information for all external users involved in the management of these same internal registers 74, which constitutes a real time saver for the external user or users who no longer need to refer to documents giving the specifications of the various computing components in order to find the name and address of one or the other of the internal registers 74 in line with their needs. Preferably, the list of the internal registers 74 of the various computing components 71-73 is included in the service modules 30 provided to the external user. This list contains, for each internal register 74, the name of this internal register 74, the address of the internal register 74, and a description of each of the bits 75 of the internal register 74.

Presentation layer 2 is a layer that formats the information that has been passed upwards from the internal registers 74, in order to make it ergonomic and easy to understand by external users. The layers 2 and 3 are developed here in a relatively high-level language that is for example the Python language. All the modifications made to layers 2 and 3 and their enrichment is symbolized by the element 80.

Application layer 1 includes command lines 11 in high-level language that will be able to be easily used by the external user of personal computer 81 in order to manage, extract data, and even modify, if needs be, the bits 75 of the internal registers 74 of server 83. Through the implementation of the service modules 30 at the service modules layer 3, in other words in the personal computer space 81 and upstream of the IPMI toolbox 4, precise management of said internal registers 74 is made possible for the external user through the use of simple command lines 11. Advantageously, these command lines 11 can be grouped into one or more scripts 12. Thus, starting a script 12 running can automatically execute at the appropriate time several command lines and bring up directly on the display various information on internal registers 74 for the external user. Preferably, the language used for script or scripts 12 and their modules ("libraries") is the Python language, which also allows object-oriented programming. This language makes it possible to easily provide the user with an interface operating in "control interface" mode, as well as with libraries from which the script or scripts 12 can be written by an external user and reused by the next external user.

Figure 2:
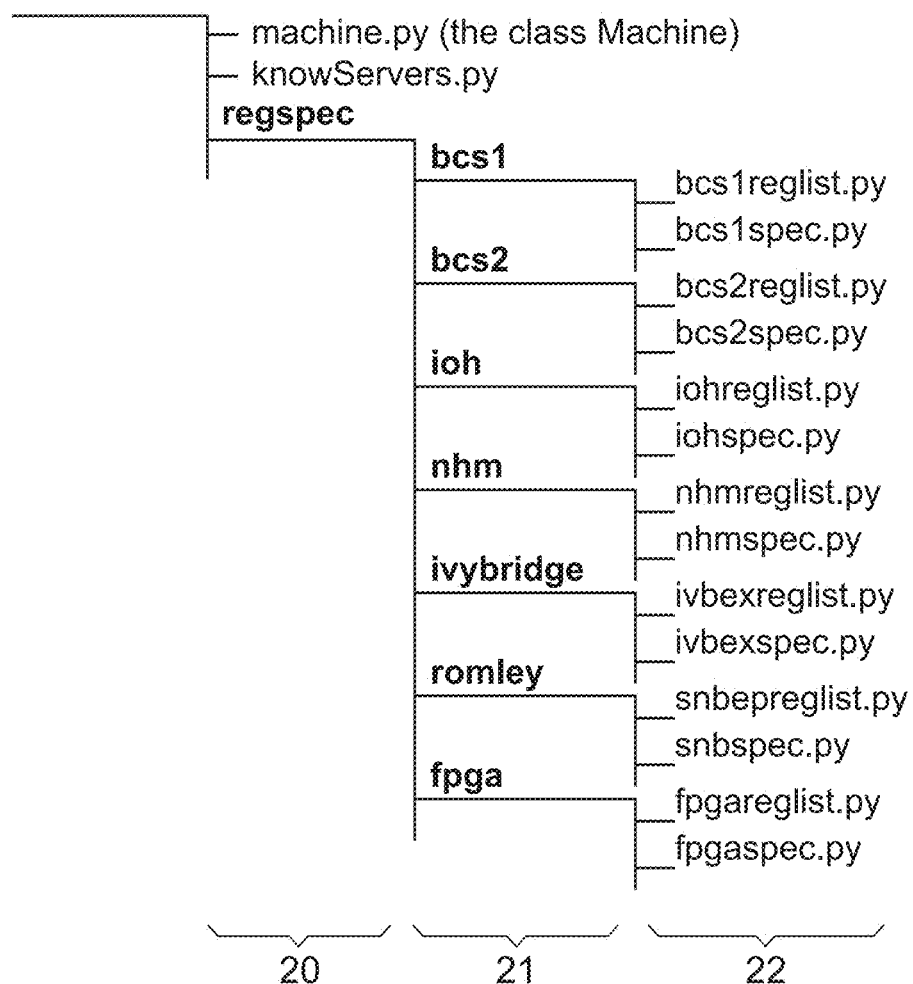
FIG. 2 schematically shows an example of the tree structure of object classes for the Python language corresponding to the software architecture of FIG. 1, according to one embodiment of the invention.

FIG. 2 schematically shows an example of the tree structure of object classes for the Python language corresponding to the software architecture of FIG. 1, according to one embodiment of the invention. Starting from a root 20 of the tree the list of the various computing components 21 unfolds. From top to bottom, the first three computing components 21 are ASIC-type components, the following three components 21 are CPU-type computing components, while the last computing component 21 is of the FPGA type. Each component 21, 22 has associated therewith multiple files 22, namely file 22 of type "reglist" which comprises a list of all the internal registers 74 of the computing component 21 concerned, while the file 22 of type "spec" contains a description of the content of the various internal registers 74 of the computing component 21 concerned. It is these files 22 that will be used by service modules 30 when transforming high level command lines from the external user into access commands of type IPMI directly understood by the service processor. The files 22 are generated during the generation of the basic input/output system (the BIOS "Basic Input Output System"), in a further step in building the basic input/output system.

Figure 3:
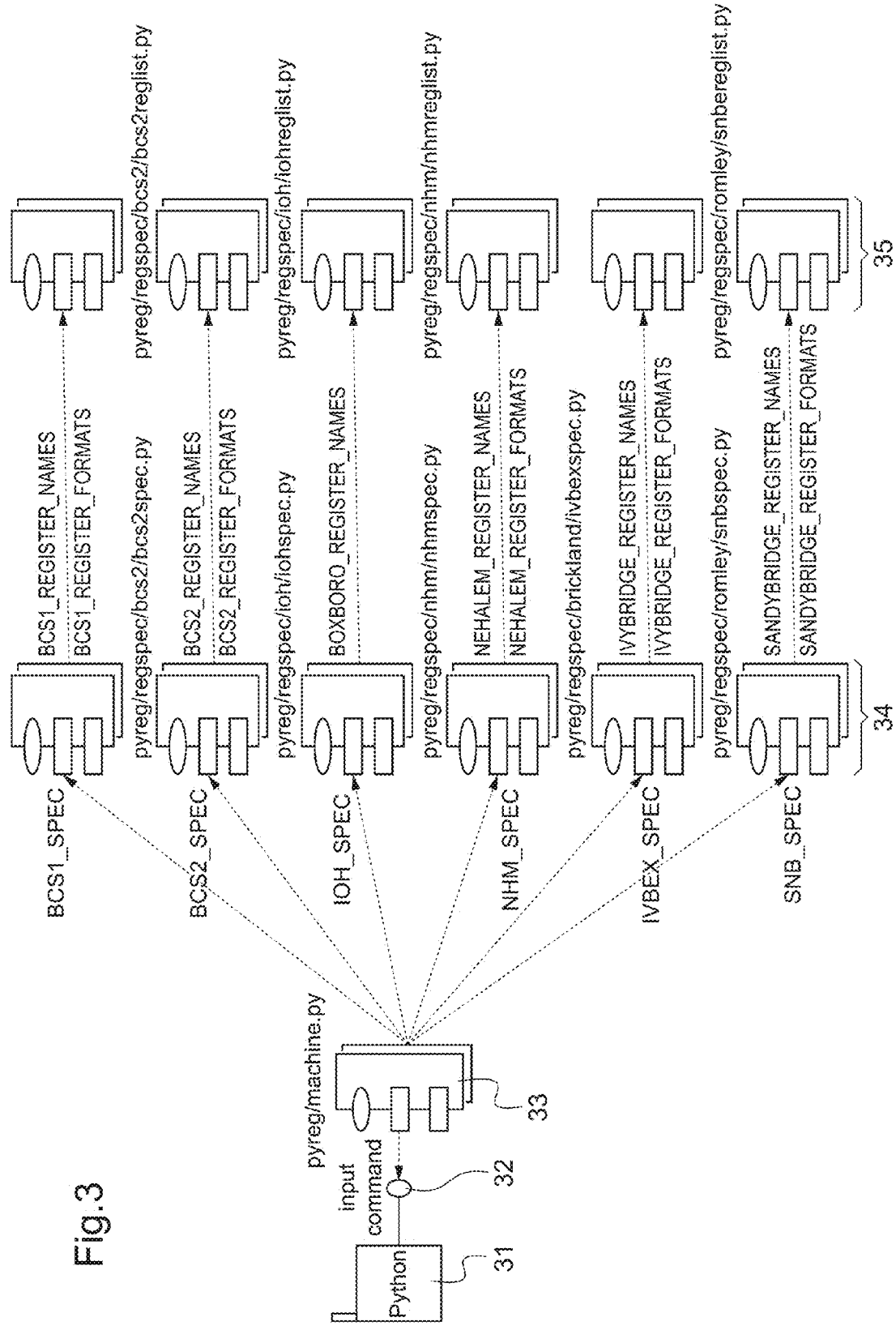
FIG. 3 schematically shows an exemplary diagram of the components for the Python language corresponding to the software architecture of FIG. 1, according to one embodiment of the invention.

FIG. 3 schematically shows an exemplary diagram of the components for the Python language corresponding to the software architecture of FIG. 1, according to one embodiment of the invention. For one command line 32 written in the Python language 31, the file 33 containing the list of computing components can fetch the missing information to be integrated into the command line 32, into file 34 concerning the contents of the internal registers for this computing component and into the file 35 containing the name, address and addressing format of the internal registers of the particular computing component. Files 34 and 35 of FIG. 3 give details of files 22 of FIG. 2.

FIG. 4 schematically shows an example of a response to an external user command line, corresponding to the software architecture of FIG. 1, according to one embodiment of the invention. Line 40 indicates the information being passed upwards. Line 41 specifies the type of server in question, here "Mesca2-EVT2-BCS4". Line 42 specifies the type of computing component concerned, here "FPGA No. 0". Line 43 specifies both the type of management operation concerned, here "read", and the type of internal register concerned, here "CIX_Functionality_Register_1", consequently that it was the contents of said internal register "CIX_Functionality_Register_1" which was read. Line 44 gives first the address of the internal register, here "12", corresponding to an internal register of 4 bits, these bits then being enumerated. The name of the field corresponding to the first bit of the internal register is here "EMERGENCY_PWROFF" and its value is 0. The name of the field corresponding to the second internal register bit is here "MRM_HOT_PLUG" and its value is 0. The field name corresponding to the third internal register bit is here "PCIE_HOT_PLUG" and its value is 1. The name of the field corresponding to the fourth internal register bit here is "LCP_PWRON" and its value is 1. The first and fourth bits concern states of the power supply, while the second and third bits relate to connection states. The state of the internal registers of the computing components gives a description of the primary configuration of the server so that the operating system (OS "Operating System") can then take over.

Obviously, the present invention is not limited to the examples and the embodiments described and depicted but is capable of numerous variants accessible to persons skilled in the art.

The invention claimed is:

1. A method for accessing a plurality of internal registers of a server in communication, over a network, with a computing device of an external user, comprising:
    the user entering commands, using the computing device that includes stacked layers of an application layer stacked on a service modules layer that is in turn stacked on a IPMI tool box, the IPMI toolbox being an intelligent platform management interface communication device between the computing device of the external user and the server, the commands being in high-level language for managing data of the internal registers of the server and including names of the internal registers, the user entering the commands in the application layer;

with one or more service modules in the service module layer, automatically transforming the command lines into access commands in a communication protocol directly understandable by a service processor of said server, said one or more service modules mapping the names of said internal registers contained in said command lines, to at least corresponding addresses of said internal registers in said access commands, the communication protocol being an IPMI language;

with the IPMI toolbox, encapsulating the access commands into messages transmittable over the network; transmitting said messages over the network from the computing device to the server; and with a concurrent access management layer of said service processor, receiving said messages transmitted from the computing device and accessing to said internal registers using one or more access protocols to access said internal registers, wherein, upon receiving said messages with plural concurrent user-commanded requests for access of a same internal registers of the server, said concurrent access management layer manages user-command access to said internal registers and a possible risk of collision with a monitoring access under direct control of said service processor to said internal registers for purposes of updating a copy of a status of said internal registers.

2. The access method according to claim 1, wherein said one or more service modules associate to names of said internal registers contained in said command lines, also addressing formats corresponding to said internal registers in said access commands.

3. The access method according to claim 1, wherein at least one of said service modules contains a list of names of said internal registers associating to said names, corresponding addresses of said internal registers, said list comprising all said internal registers which may be accessed by said user, and wherein, upon each configuration of the server, said list is updated.

4. The access method according to claim 3, wherein said list also associates to said names and said addresses, a description of all the bits of said internal registers.

5. The access method according to claim 1, wherein said risk of collision is avoided by keeping said access controlled by the user on hold during all stages of progression of said monitoring access which will not be interrupted.

6. The access method according to claim 5, wherein the progression of said monitoring access comprises at least the sequence of one of a step of reconfiguring a multiplexer located between the service processor and said internal registers and a step of reading at least one of said internal registers.

7. The access method according to claim 1, wherein said command lines can be grouped into one or more scripts.

8. The access method according to claim 1, wherein the command lines only require a user to supply a name of the internal register to be accessed, to the exclusion of its address, its address format and its access mode.

9. The access method according to claim 1, characterized in that, in response to one of said command lines from said user, values of bits of said internal registers are displayed together with field names corresponding to these bits.

10. The access method according to claim 1, wherein the language of said command lines is Python.

11. The access method according to claim 1, wherein said communication protocol is the IPMI protocol.

12. The access method according to claim 11, wherein said IPMI communication protocol runs on an Ethernet bus.

13. The access method according to claim 1, wherein said internal registers belong to one or more components of the server, one or more CPUs, and/or one or more ASICs, and/or one or more FPGAs that is one of said components.

14. The access method according to claim 1, wherein the concurrent access management layer establishes a hierarchy of access requests, a request for monitoring access, for updating the copy of the status of said internal registers having a higher priority than an access request originating from the external user, the hierarchy of access requests being used to manage the access to said internal registers and avoid the risk of collision, said concurrent access management layer being entirely managed by said service processor.

* * * * *